3,205,059
METHOD OF REDUCING TRANSPIRATION IN PLANTS
Wyndham J. Roberts, Champaign, Ill., assignor to Illinois State Water Survey Division, Champaign County, Urbana, Ill.
No Drawing. Filed Dec. 5, 1963, Ser. No. 329,612
8 Claims. (Cl. 71—2.7)

This invention relates to moisture transpiration from plants. In its more specific aspect, this invention relates to a method for inhibiting transpiration of moisture from plants; and further relates to plant seed treated in accordance with this invention, whereby plants grown from the seed exhibit a reduction in moisture transpiration.

Heretofore, efforts have been made to reduce or inhibit transpiration of vapor from growing plants by spraying the plants with a sealing material so that the amount of moisture required for growth would be reduced. This has not been successful because the sealing material nearly completely seals the plant stomata, and interferes with the absorption of carbon dioxide and the passage of oxygen from the plants, both of which are necessary for photosynthesis.

I discovered a completely new approach to the problem of reducing or inhibiting moisture transpiration from plants. According to the present invention, a higher fatty alcohol is incorporated into the organal system of the plant, as explained below in greater detail. The phrase "organal system" as used herein and in the appended claims is employed in the conventional botanical sense as designating the roots, trunk (stems) and leaves. In this manner, transpiration of moisture from the plant is effectively reduced or inhibited without interfering with the absorption of carbon dioxide and generation of oxygen.

As a result of my invention, the amount of water requisite for plant growth is substantially reduced. Further, it will be observed that a reduction in moisture transpiration decreases heat loss resulting from evaporation, and consequently the quantity of heat required from ambient sources for effective growth of the plant is decreased. Hence, by reason of my invention, it is possible for plants to grow and survive in relatively colder climates and to expand the latitudinal growing belt.

More specifically, my invention comprises incorporating into the organal system of the plant higher fatty alcohols containing from 12 carbon atoms to 24 carbon atoms per molecule, or mixtures thereof. In the preferred embodiment, I employ alcohols containing 16 to 18 carbon atoms per molecule, e.g., hexadecanol and octadecanol. Tallow alcohol, such as derived from beef tallow, and containing approximately 35% hexadecanol and 65% octadecanol is particularly suitable, although the alcohol may be derived from other sources. Other natural sources, such as whale blubber, may be employed.

In one embodiment of the invention, higher fatty alcohol may be supplied to, or placed in the soil during planting and in the vicinity of, or adjacent to, the seeds. In practice, it should be understood that any application of the alcohol to the soil need not be contemporaneous with planting, but may be accomplished shortly before or after planting. Where desired, the alcohol may be applied to the soil adjacent the plant. Certain of the alcohols useful for my invention, such as tallow alcohol, are normally a solid, and where desired the alcohol may be applied to the soil in powdered or flake form.

If desired, the higher fatty alcohol may be admixed with peat moss or mulch and applied to the soil adjacent to a growing plant, or to the soil before or after a plant or seed is planted.

The alcohol may be dispersed with a suitable emulsifying agent in an aqueous solution. Suitable emulsifying agents include, for example, Myrj 45 (a polyoxyethylene strearate) and Tween 60 (a polyoxyethylene sorbitan monostearate).

Where desired, the higher fatty alcohol may be dispersed in a solution of a suitable plant nutrient, for example ammonium nitrate or ammonium phosphate, or a non-toxic agricultural fungicide, such as pentachlorophenol, chloranil (tetrachloroquinone) or Semesan (a phenyl mercury derivative). Where desired, an emulsifying agent may be admixed with the dispersion of alcohol and nutrient or alcohol and fungicide. A particularly suitable nutrient is Hoagland's Solution which contains:

| | Molar |
|---|---|
| Calcium nitrate | .005 |
| Potassium nitrate | .005 |
| Magnesium sulphate | .002 |
| Potassium dihydrogen phosphate plus 5 p.p.m. iron (5 mg. per liter) | .004 |

An emulsion or dispersion of the higher fatty alcohol, as described above, should contain not less than about 1% by weight of alcohol in order to provide the plant environment with a reasonably effective quantity of alcohol. Although concentrations of 50% or more by weight alcohol may be used, there generally is no benefit from employing a concentration in excess of about 20% but this will depend somewhat upon such conditions as the type of soil, type of plant and climate. I have found that a solution containing about 1% to 20% by weight of higher fatty alcohol is generally satisfactory, and more preferably about 5% to 15%.

The quantity of higher fatty alcohol which may be employed in application to the soil may vary over a relatively wide range depending somewhat upon such conditions as soil, climate and the particular plant. In practice, the furrow depth in the United States is approximately 6½ to 7 inches, but it should be understood that this can vary depending upon the locale. The higher fatty alcohol is preferably admixed with the soil as by disking throughout a substantial portion of the furrow depth. Generally the application rate of higher fatty alcohol should not be less than about 25 pounds of alcohol per acre, for rates lower than this are not sufficiently effective in reducing moisture transpiration. An application rate of as high as 1200 pounds per acre, or higher, may be employed without any toxic effect on the plants. However, there appears to be no added benefit in using a rate in excess of 900 pounds of alcohol per acre. I have found that a rate of about 25 pounds to 500 pounds of alcohol is satisfactory, and more preferably a rate of about 50 to 300 pounds per acre.

Plant seeds may be provided with a coating or film of a higher fatty alcohol suitable for use in the invention, as described above. It should be understood, however, that in order for the seed to germinate, it is necessary for water to make contact with the seed. The coating therefore at time of planting should not completely cover the seed. In coating applications, an application rate of about 0.3% to 3% of alcohol based on the weight of the dry seed is generally satisfactory. It is preferable, however, that this range be between 0.5% and 1%.

The seed may be provided with an inert coating, preferably water soluble, and a coating of the higher fatty alcohol. Suitable inert coating materials include, for example, water soluble synthetic organic polymers such as cellulose nitrate, cellulose acetate, sodium carboxymethyl cellulose and the like. Additional inert coating materials include, for example, shellac and natural and mineral waxes such as beeswax, carnauba wax and paraffin wax. Where desired, the seed is provided with a plurality of alternative coatings and one or more of these coatings might include a fungicide or a nutrient, such as those described above.

My invention is further illustrated by the following examples:

*Example I*

500 milligrams of powdered tallow alcohol was added to the sterilized soil of each of 12 clay pots of 8″ diameter. An additional 12 pots of the same size containing sterilized soil were used as controls, and hybrid corn seeds were placed in all 24 pots. All of the pots were placed in a greenhouse and an ample water supply was maintained but no additional plant food was added to the pots. At the end of four weeks, the corn stalks were cut directly above the surface of the soil and their water demands immediately measured by means of a potometer. A potometer is a well known botanical testing instrument in which a plant stem is surrounded by a water filled system in communication with a water source. The rate of water use by the plant can be measured by the linear rate of travel of a bubble of air in the feed water as it passes through a calibrated tube.

Comparison of the ratios of water loss to these areas of the control plants and for the treated plants shows that the values for the treated samples averaged 62.5% of those of the controls. This indicated that water movement through the plants growing in the treated soil was substantially less than that of the control plants.

*Example II*

Two groups of 8 hybrid corn plants each were germinated in small plastic cups containing vermiculite in a greenhouse and allowed to reach the 3-leaf stage in a period of 10 days. With one group, 8 control hybrid corn plants were grown only in vermiculite and water. Another group of 8 hybrid corn plants was grown similarly except that 0.5 gram of tallow alcohol was added to the vermiculite in each pot. After the plants had reached the 3-leaf stage they were watered and the pots covered with aluminum foil through which the stalks were allowed to project. Twenty-four hours later, the plants were weighed at 1-hour intervals throughout the day. At the end of the day the stems were cut at the surface of the aluminum foil. The plants weights were then correlated with the individual plant water losses and it was found that the control plants had lost an average of 10.98 grams of water per gram of plant material grown, whereas the plants grown in vermiculite having tallow alcohol added varied from 6.43 to 8.41 grams of water lost per gram of plant material produced.

*Example III*

Two groups of 5 hybrid corn plants each were planted in sterilized soil in plastic cups. One group of 5 hybrid corn plants served as a control, and with the second group 0.5 gram of tallow alcohol was added to the soil. After they reached the 3-leaf stage the pots were covered with aluminum foil through which the stalks protruded and the stalks were adequately watered. Two days later they were weighed every other hour during an 8-hour period. At the end of the period the control plants had transpired 9 to 12 percent more water than the treated plants. Nineteen days later, on a sunny day, a similar weighing was conducted. The results indicated less transpiration of water, up to 15 percent, in the treated plants as compared to the controls.

*Example IV*

15 wooden flats, approximately 15″ x 23″, were filled with soil and planted with corn (U.S. 13) and soybean seeds (Lincoln). Before planting, a portion of the seeds were admixed in a water slurry of tallow alcohol. The treated seeds comprised 0.5% tallow alcohol based on the dry weight of the seeds. Five of the flats were planted with treated seeds, and the remainder of the flats were planted with untreated seeds. Approximately three weeks later, the soil of five of the flats planted with untreated seeds was treated with a 5% tallow alcohol emulsion at the rate of 10 pounds of tallow alcohol per acre. The remaining five flats were used as controls. A subsequent water control test indicated that under water stress conditions (250 ml. every three days) the plants of both the seed treated flats and the soil treated flats exhibited increased wilt resistance as compared to the control plants. Also, with an adequate water supply (1500 ml. every three days) the plants of both the seed treated flats and the soil treated flats showed 10% to 15% increased growth as compared to the control flats.

*Example V*

The experiment of Example IV was repeated under the same conditions except that the soil in five flats was treated with tallow alcohol emulsion at the rate of 25 pounds of tallow alcohol per acre immediately after planting the seeds. The plants were then allowed to grow under adequate water conditions for approximately three weeks. Then all of the flats were subjected to water stress conditions. Approximately one week later it was observed that the untreated plants, both soybean and corn, had begun to wilt rather badly, but the treated plants appeared healthy. All of the plants were then abundantly watered and allowed to continue to grow with an adequate water supply. Again an increase in growth of the treated plants, as compared to the control plants, was noted. The plants were then analyzed with the following results:

|  | Seed Treated | Soil Treated | Control |
|---|---|---|---|
| Corn: |  |  |  |
| Wet Weight (grams) | 136.1 | 102.8 | 58.0 |
| Dry Weight (grams) | 15.7 | 13.7 | 6.8 |
| Percent $H_2O$ Present in fresh tissue | 88.4% | 87.4% | 88.1% |
| Nitrogen | 0.7% | 1.0% | 0.8% |
| Fat | 1.8% | 1.5% | 1.8% |
| Ash | 12.3% | 11.5% | 15.8% |
| Fiber | 36.0% | 33.0% | 30.0% |
| Soybean: |  |  |  |
| Wet Weight (grams) | 7.2 | 9.1 | 3.8 |
| Dry Weight (grams) | 1.9 | 2.6 | 1.2 |
| Percent $H_2O$ Present in fresh tissue | 74.3% | 72.0% | 69.5% |
| Nitrogen | 2.4% | 2.1% | 2.5% |
| Ash | 8.2% | 7.5% | 7.8% |

It will be noted that this table shows that the treated plants have approximately twice the wet weight of the untreated plants.

Both the treated and the untreated plants were tested by a Warburg apparatus to measure the rate of respiration. The following results were obtained:

| Plant | Control | Seed Treated 0.5% Tallow Alcohol Based on the Dry Weight of the Seeds | |
|---|---|---|---|
|  | Resp. in ml. $O_2$ consumed/ hour | Resp. in ml. $O_2$ consumed/ hour | Percent Difference |
| Soybean | 46.7 | 41.7 | 10.8 |
| Corn | 43.9 | 35.9 | 18.0 |

Example VI

Rye grass was planted in 20' x 20' plots. Each plot was fertilized with two pounds of commercial turf building at planting time. Two of the plots were treated with 125 grams of powdered tallow alcohol per plot, two of the plots were treated with 125 grams of flaked tallow alcohol per plot, and two of the plots were treated with 125 grams of tallow alcohol in an emulsion containing 10% tallow alcohol, 89% water and 1% of non-ionic tallow alcohol ethylene oxide concentrate. Four plots were used for control purposes. The plots were designated alphabetically. The grass was cut with the same mower, with the identical blade adjustment, on several successive weeks with the following results:

| Treatment Per Plot | Plot | Fresh Weight of Clippings | | | | | | | | | | |
|---|---|---|---|---|---|---|---|---|---|---|---|---|
| | | 8/28 | 9/6 | 9/11 | 9/18 | 9/25 | 10/2 | 10/9 | 10/16 | 10/23 | 11/3 | Total Weight |
| 125 g. powdered alcohol | D | 8.5 | 8.5 | 6.0 | 4.5 | 2.0 | 1.5 | 3.0 | 1.5 | 2.0 | 4.5 | 42.0 |
| | O | 4.5 | 6.5 | 6.5 | 4.0 | 1.5 | 1.5 | 2.5 | 1.0 | 1.0 | 2.5 | 31.5 |
| 125 g. flake alcohol | G | 9.5 | 9.0 | 7.0 | 4.0 | 2.0 | 1.5 | 3.0 | 1.5 | 1.5 | 4.0 | 43.0 |
| | T | 8.0 | 6.5 | 8.0 | 4.5 | 1.0 | 1.0 | 3.0 | 1.5 | 1.5 | 4.5 | 39.5 |
| 1,250 g. alcohol from an Emulsion. | K | 8.0 | 9.0 | 8.0 | 5.0 | 1.5 | 1.0 | 3.0 | 1.0 | 1.0 | 3.0 | 40.5 |
| | R | 6.0 | 5.0 | 6.0 | 3.0 | 1.5 | 1.0 | 2.0 | 1.5 | 1.0 | 2.5 | 29.5 |
| Control | C | 6.0 | 7.0 | 6.0 | 4.0 | 2.0 | 1.5 | 2.5 | 1.5 | 1.5 | 4.0 | 36.0 |
| | H | 4.5 | 5.0 | 4.5 | 3.0 | 1.0 | 0.5 | 2.0 | 1.5 | 1.0 | 2.5 | 25.5 |
| | J | 5.0 | 6.5 | 7.5 | 4.0 | 1.5 | 1.0 | 2.0 | 1.0 | 1.0 | 3.0 | 32.5 |
| | S | 6.5 | 7.0 | 7.0 | 4.0 | 1.0 | 1.0 | 2.5 | 1.5 | 1.0 | 3.0 | 34.5 |

This table indicates that an increase in growth is obtained with the application of tallow alcohol applied in the above manner.

Example VII

During the summer months a field test was conducted at the Agronomy Research Center, Southern Illinois University. On June 26, several plots, each measuring 10 feet x 25 feet were planted in Piper Sedan grass. 8 additional plots were left fallow. The plots were laid out in the Latin square with 4 replications of each of several treatments.

Four plots were treated with an alcohol mixture comprising 35% hexadecanol and 65% octadecanol. The rate of application of alcohol to the soil was 150 pounds per acre. From about August 21 to October 15 a drought condition prevailed, the total rainfall being 0.65 inch. During the growing season, the grass was harvested on July 16 and August 20. The third cutting on October 16 showed a yield from the plots that were treated 9.3% greater than that of the controlled plots.

In instances where cut plants must be kept fresh over considerable periods and the feed water supply is limited, such as in the case of corsages or bouquets of several types of cut flowers, the higher fatty alcohol may be dispersed in the water of the vial customarily used for this purpose. Furthermore, Christmas trees can be kept fresh looking and fire-safe indoors over a considerable period of time by adding the higher fatty alcohol to containers conventionally used to provide water to the tree.

Studies have been made to trace the route of the higher fatty alcohol through the plants. This was accomplished by growing a group of corn plants in a nutrient solution containing radioactive tallow alcohol. 0.7 mg. of tallow alcohol having total activity of 0.5 millicurie was dissolved in 10 ml. of ethanol and diluted in 200 ml. of distilled water. The alcohol molecule was tagged next to the hydroxyl ion with radio active $C_{14}$. In this manner, the total activity of 0.5 millicurie measures the rate of disintegration in seconds of the $C_{14}$. Ten corn plants, which had been grown in vermiculite to the 3-leaf stage, were threaded through cork stoppers and their roots inserted in 200 ml. glass jars. Ten ml. of the radioactive solution was added to the 100 ml. nutrient solutions in each jar. There were also 2 control plants grown in similar nutrient solutions, but without tallow alcohol. Eight days later the plants were taken from the jars and washed thoroughly, dried and exposed to on an X-ray film. The radioautographs indicated a concentration of alcohol in the root structures, and also showed that the radioactive isotope had traveled through the root structure to all parts of the plant, including the leaves.

The radioautographs thereby indicate that the higher fatty alcohol is ingested by the plant. The blocking action is predominate in the roots and stomata, and transpiration of moisture is substantially inhibited without interfering with the free passage of oxygen and carbon dioxide. Transpiration of moisture from plants is reduced from about 10% to 18% by treatment with higher fatty alcohols. In addition, plants so treated exhibit greater wilt resistance, particularly under water stress conditions, and they show from 10% to 15% increased growth over controlled plants.

This application is a continuation-in-part of applicant's co-pending applications Serial No. 166,238, now abandoned, entitled "A Product for Controlling the Rate of Transpiration From Plants and a Method for Making and Using Same," filed January 15, 1962, and Serial No. 97,321, now abandoned, entitled "A Product for Controlling the Rate of Transpiration From Plants and a Method for Making and Using Same," filed March 21, 1961.

Having described my invention and certain embodiments thereof, I claim:

1. The method of substantially inhibiting transpiration of moisture from a plant which comprises applying a higher fatty alcohol in an inert liquid carrier to the soil in the region in which the plant is growing, said alcohol applied to the soil at a rate of not less than 25 pounds per acre, whereby said alcohol is ingested by the plant and inhibits moisture-transpiration from the atmosphere exposed portions of the plants.

2. The method according to claim 1 wherein said higher fatty alcohol is applied to the soil at a rate of about 25 to 500 lbs. per acre.

3. The method according to claim 1 wherein said higher fatty alcohol contains 12–24 carbon atoms per molecule.

4. The method according to claim 1 wherein said higher fatty alcohol contains 16–18 carbon atoms per molecule.

5. The method according to claim 1 wherein said higher fatty alcohol is tallow alcohol.

6. The method according to claim 1 wherein the said higher fatty alcohol is applied as an emulsion containing 1–20% of said alcohol, emulsifying agent and an inert carrier.

7. The method according to claim 1 wherein said higher fatty alcohol is applied as an admixture comprising 1–20% of said alcohol, an emulsifying agent, a plant nutrient and an inert carrier.

8. The method according to claim 1 wherein said higher fatty alcohol is applied as an admixture comprising 1–20% of said alcohol, an emulsifying agent, a fungicide and an inert carrier.

(References on following page)

References Cited by the Examiner

UNITED STATES PATENTS

| | | |
|---|---|---|
| 2,081,667 | 5/37 | Heyl ---------------- 47—58 |
| 2,313,057 | 3/43 | Fischer. |
| 2,867,944 | 1/59 | Fletcher ------------ 47—58 |
| 2,903,330 | 9/59 | Dressler. |
| 2,923,095 | 2/60 | Magimel-Pelonnier. |
| 2,967,376 | 1/61 | Scott ---------------- 47—1 |

FOREIGN PATENTS

| | | |
|---|---|---|
| 1,184,100 | 2/59 | France. |
| 1,220,166 | 1/60 | France. |

OTHER REFERENCES

Nikken Chemical Co., Japan printed application No. 33/6,123, August 1958.

Baumgartner, L. L.: Rosebush Protection, in New York Times, Sunday, January 25, 1959, Section 2, page X43.

Chemical Abstracts, vol. 53, columns 19266 and 19267, Oct. 25, 1959, article "Agents for Increasing the Temperature and Decreasing the Evaporation of Irrigating Water in Accelerating the Growth of Rice."

Condensed Chemical Dictionary, fifth ed., N.Y., Reinhold, 1956, page 473.

Neales, T. F.: Reduction of Plant Transpiration by Cetyl Alcohol, in Nature (magazine, London, England), vol. 195, No. 4847, pages 1221 and 1222, Sept. 22, 1962.

Olsen, S. R., et al.: Effect of Hexadecanol and Octadecanol on Efficiency of Water Use and Growth of Corn, in Agronomy Journal 54 (6), pp. 544–45, December 1962.

Taylor's Encyclopedia of Gardening, third edition, Boston, Houghton Mifflin, 1957, pages 386 and 387, article on Fungicides.

Water-Loss Investigation: Lake Hefner 1958 Evaporation Reduction Investigations, report by the Collaborators, Oklahoma City, Okla., June 1959, pages 7, 61, 62.

ABRAHAM G. STONE, *Primary Examiner.*

T. GRAHAM CRAVER, *Examiner.*